(12) United States Patent
Eshet et al.

(10) Patent No.: US 11,025,657 B2
(45) Date of Patent: Jun. 1, 2021

(54) SELECTIVE DATABASE LOGGING WITH SMART SAMPLING

(71) Applicant: Imperva, Inc., Redwood City, CA (US)

(72) Inventors: Ehud Eshet, Tel-Aviv (IL); Ophir Bleiberg, Tel-Aviv (IL)

(73) Assignee: Imperva, Inc., San Mateo, CA (US)

( * ) Notice: Subject to any disclaimer, the term of this patent is extended or adjusted under 35 U.S.C. 154(b) by 293 days.

(21) Appl. No.: 16/218,503

(22) Filed: Dec. 13, 2018

(65) Prior Publication Data
US 2020/0195668 A1 Jun. 18, 2020

(51) Int. Cl.
| | | |
|---|---|---|
| *H04L 29/06* | (2006.01) | |
| *H04L 12/26* | (2006.01) | |
| *H04L 12/851* | (2013.01) | |
| *G06F 16/906* | (2019.01) | |
| *H04L 12/24* | (2006.01) | |

(52) U.S. Cl.
CPC ........ *H04L 63/1425* (2013.01); *G06F 16/906* (2019.01); *H04L 41/024* (2013.01); *H04L 43/04* (2013.01); *H04L 43/062* (2013.01); *H04L 43/08* (2013.01); *H04L 43/16* (2013.01); *H04L 47/2483* (2013.01)

(58) Field of Classification Search
CPC ..... H04L 63/1425; H04L 43/08; H04L 43/04; H04L 47/2483; H04L 43/062; H04L 43/16; H04L 41/024; H04L 41/0816; H04L 43/02; H04L 47/823; H04L 47/2441; G06F 16/906
See application file for complete search history.

(56) References Cited

U.S. PATENT DOCUMENTS

| | | | | |
|---|---|---|---|---|
| 9,584,395 B1* | 2/2017 | Rapoport | ............ | H04L 41/0681 |
| 9,674,042 B2* | 6/2017 | Lissack | .................. | H04L 41/12 |
| 10,291,506 B2* | 5/2019 | Mixer | ..................... | H04L 63/00 |
| 10,505,814 B2* | 12/2019 | Lissack | .................. | H04L 41/12 |
| 2014/0165133 A1* | 6/2014 | Foley | ..................... | H04L 63/14 726/1 |
| 2015/0149611 A1* | 5/2015 | Lissack | .................. | H04L 43/16 709/224 |

(Continued)

OTHER PUBLICATIONS

Imperva, "SecureSphere—Database Security," User Guide, Version 13.1, Jun. 2018, pp. 1-3 and 662-676.

*Primary Examiner* — Cheng-Feng Huang
(74) *Attorney, Agent, or Firm* — Nicholson De Vos Webster & Elliott LLP (57) ABSTRACT

A method by a security analysis server to generate a traffic monitoring rule. The method includes receiving, from a database agent because of a current configuration of the database agent, counts of an amount of traffic sent over a first set of one or more of the database connections being monitored by the database agent and generating a traffic monitoring rule that indicates database connections for which the database agent is to send counts of an amount of traffic, rather than all the traffic, sent over those database connections to the security analysis server because those database connections have been determined by the security analysis server to be of an application database connection type based on an analysis by the security analysis server of the counts. The method further includes applying the traffic monitoring rule by sending instructions to the database agent to alter the current configuration.

20 Claims, 4 Drawing Sheets

(56) References Cited

U.S. PATENT DOCUMENTS

| | | | |
|---|---|---|---|
| 2015/0149631 A1* | 5/2015 | Lissack | H04L 43/16 709/226 |
| 2016/0078203 A1* | 3/2016 | Moloian | G06F 21/31 726/17 |
| 2016/0088000 A1* | 3/2016 | Siva Kumar | H04L 63/10 726/23 |
| 2016/0261482 A1* | 9/2016 | Mixer | H04L 43/04 |
| 2016/0337400 A1* | 11/2016 | Gupta | H04L 63/02 |
| 2017/0272331 A1* | 9/2017 | Lissack | H04L 41/12 |
| 2018/0040064 A1* | 2/2018 | Grigg | G06N 5/022 |
| 2019/0140906 A1* | 5/2019 | Furuichi | H04L 41/12 |

* cited by examiner

SELECTIVE DATABASE LOGGING WITH SMART SAMPLING

TECHNICAL FIELD

Embodiments of the invention relate to the field of database activity monitoring, and more specifically, to dynamically generating a traffic monitoring rule.

BACKGROUND ART

Database servers are computer programs that provide database services to other computer programs, which are typically running on other electronic devices and adhering to the client-server model of communication. Many web applications utilize database servers (e.g., relational databases to store information received from Hypertext Transfer Protocol (HTTP) clients and/or information to be displayed to HTTP clients). However, other non-web applications may also utilize database servers, including but not limited to accounting software, other business software, or research software. Further, some applications allow for users to perform ad-hoc or defined queries (often using Structured Query Language (SQL)) using the database server. Database servers typically store data using one or more databases. Thus, in some instances a database server can receive a SQL query from a client (directly from a database client process or client end station using a database protocol, or indirectly via a web application server that a web server client is interacting with), execute the SQL query using data stored in the set of one or more database objects of one or more of the databases, and may potentially return a result (e.g., an indication of success, a value, one or more tuples, etc.).

Databases may be implemented according to a variety of different database models, such as relational (such as PostgreSQL, MySQL, and certain Oracle® products), non-relational, graph, columnar (also known as extensible record; e.g., HBase), object, tabular, tuple store, and multi-model. Examples of non-relational database models (which are also referred to as schema-less and NoSQL) include key-value store and document store (also known as document-oriented as they store document-oriented information, which is also known as semi-structured data). A database may comprise one or more database objects that are managed by a Database Management System (DBMS), each database object may include a number of records, and each record may comprise a set of fields. A record may take different forms based on the database model being used and/or the specific database object to which it belongs; for example, a record may be: 1) a row in a table of a relational database; 2) a JavaScript Object Notation (JSON) document; 3) an Extensible Markup Language (XML) document; 4) a key-value pair; etc. A database object can be unstructured or have a structure defined by the DBMS (a standard database object) and/or defined by a user (custom database object). In a cloud database (a database that runs on a cloud platform and that is provided as a database service), identifiers are used instead of database keys, and relationships are used instead of foreign keys. In the case of relational databases, each database typically includes one or more database tables (traditionally and formally referred to as "relations"), which are ledger-style (or spreadsheet-style) data structures including columns (often deemed "attributes", or "attribute names") and rows (often deemed "tuples") of data ("values" or "attribute values") adhering to any defined data types for each column.

An enterprise may deploy one or more database agents to monitor the database activity of its databases. A database agent (sometimes referred to simply as "agent") is a piece of software typically installed locally to or close to the databases that is configured to monitor the database activity of those databases. The database agent is typically implemented as a lightweight process to impose minimum overhead on the database server. The database agent thus performs minimal analysis of the traffic it sees before forwarding it to a security analysis server for further analysis. The security analysis server can perform a more detailed analysis of the traffic and make various security decisions based on its analysis of the traffic (e.g., decide whether certain traffic is suspicious and/or malicious, and whether to block and/or generate alerts responsive to such traffic).

A database activity monitoring implementation that captures and analyzes all database traffic can be very expensive in terms of the computational costs and license costs involved (e.g., an enterprise may have to pay a security vendor a fee per monitored database instance or based on the amount of processing power used to monitor the databases), especially for enterprises that have a large number of databases and a high volume of database activity. As a result, enterprises typically only perform database activity monitoring for their most sensitive databases.

Conventional database activity monitoring implementations allow a user (e.g., network security administrator) to manually exclude certain traffic from being further analyzed by the security analysis server (e.g., it allows the user to manually exclude traffic that is known to be trusted such as traffic generated by a backup script or traffic coming from a trusted Internet Protocol (IP) address). The user can exclude certain traffic from being further analyzed by the security analysis server by configuring a traffic exclusion rule that specifies which traffic is to be excluded (which traffic the database agent should not send to the security analysis server for further analysis).

However, in practice, effective configuration of the traffic exclusion rule is virtually impossible as it requires the user to have extensive knowledge of how different applications access the databases. This becomes increasingly difficult as the number of databases increases and as new types of applications that access the databases are introduced. That is, it is difficult for the user to effectively determine which traffic is trusted and thus can be excluded and which traffic is not trusted and thus should be closely monitored. If not enough traffic is excluded, the database activity monitoring infrastructure (e.g., the database agents and/or the security analysis server) can get overloaded, which can lead to an audit loss. If new databases are added with its traffic initially excluded, information regarding the traffic to/from these databases will not be made available to the user, and thus the user may not have the necessary information regarding the traffic to effectively determine whether the traffic should remain excluded or should be further analyzed. As a result, existing database activity monitoring implementations that rely on manually configured exclusion rules have a tendency to exclude too much traffic or too little traffic. Excluding too much traffic reduces the visibility of the database activity and excluding too little traffic may overload the database activity monitoring infrastructure, either of which may compromise the security of the databases.

BRIEF DESCRIPTION OF THE DRAWINGS

The invention may best be understood by referring to the following description and accompanying drawings that are used to illustrate embodiments of the invention. In the drawings.

DETAILED DESCRIPTION

In the following description, numerous specific details such as logic implementations, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

Bracketed text and blocks with dashed borders (e.g., large dashes, small dashes, dot-dash, and dots) are used herein to illustrate optional operations that add additional features to embodiments of the invention. However, such notation should not be taken to mean that these are the only options or optional operations, and/or that blocks with solid borders are not optional in certain embodiments of the invention.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

Embodiments are described herein for dynamically generating a traffic monitoring rule based on an amount of traffic sent over database connections. According to some of the embodiments described herein, a database agent maintains the counts of the amount of traffic sent over a set of database connections and sends these counts of the amount of traffic, rather than all of the traffic, sent over the set of database connections to the security analysis server. The database agent may send a portion of the traffic sent over each of the database connections in the set of database connections to allow the security analysis server to determine the connection attributes of these database connections. The security analysis server may analyze the counts it receives from the database agent to help it determine which database connections are of the application database connection type as opposed to being of the non-application database connection type. For example, the security analysis server may determine that database connections having relatively high counts are of the application database connection type, while database connections having relatively low counts are of the non-application database connection type. In general, traffic sent over database connections of the application database connection type is more likely to be trusted (since it is generated by applications forming predefined queries), and thus the security analysis server may not need to monitor such traffic very closely. In contrast, traffic sent over database connections of the non-application database connection type is less likely to be trusted (since it is generated by users or scripts forming ad-hoc queries), and thus the security analysis server may want to monitor such traffic more closely. In some embodiments, the security analysis server generates a traffic monitoring rule based on analyzing the counts, where the traffic monitoring rule indicates the database connections for which the database agent is to send counts of the amount of traffic (instead of all of the traffic itself) sent over those database connections to the security analysis server. The traffic monitoring rule may indicate the database connections (for which the database agent is to send counts) using a set of connection attributes (e.g., that were parsed from the portions of traffic it received from the database agent). The traffic monitoring rule may be generated such that the set of connection attributes encompasses one or more of the database connections determined by the security analysis server to be of the application database connection type. The security analysis server may apply this traffic monitoring rule by sending instructions to the database agent that cause the database agent to continue sending counts of the amount of traffic sent over specific ones of the database connections that are encompassed by the security rule while causing the database agent to start sending traffic sent over all other database connections. The instructions sent by the security analysis server to the database agent may indicate the database connections (for which the database agent is to send counts) using database connection identifiers (IDs). In response to receiving the instructions, the database agent may continue to send counts for specified ones of the database connections and start sending traffic sent over all other database connections according to the instructions. If the database agent sees a new database connection, then it may initially send the traffic sent over this new database connection to the security analysis server. The security analysis server may parse this traffic to determine the connection attributes of the new database connection and evaluate these connection attributes against the traffic monitoring rule to determine whether the database agent should start sending counts of the amount of traffic sent over the new database connection to the security analysis server or should continue to send the traffic itself sent over the new database connection to the security analysis server. If the security analysis server determines that the database agent should start sending counts of the amount of traffic (instead of all of the traffic itself), then the security analysis server may send instructions to the database agent indicating as such. Otherwise, if the security analysis server determines that the database agent should continue to send the traffic itself, the security analysis server may send instructions to the database agent indicating as such (the security analysis server may not need to send such instructions if the database agent is already sending the traffic). In the latter case, the security analysis server may subsequently determine whether the new database connection is of the application database connection type based on the amount of traffic sent over that database connection (e.g., based on the traffic received from the database agent). If the security analysis server determines that this database connection is of the application database connection type, then the security analysis server may update the traffic monitoring rule such that it encompasses this database connection and start applying the updated traffic monitoring rule. In some embodiments, the security analysis server may update the traffic monitoring rule such that it no longer encompasses certain database connections, for example, if the security analysis server determines that those database connections previously determined to be of the application database connection type are actually of the non-application database connection type (e.g., based on the counts received from the database agent). In this manner, the security analysis server may generate and apply new/updated traffic monitoring rules as it receives additional information (e.g., new counts and/or traffic) and/or as circumstances change (e.g., the resource utilization of the security analysis server changes), and in turn send updated instructions to the database agent. Thus, embodiments can classify database connections as being of the application database connection type or non-application database connection type based on the amount of traffic being sent over those database connections as determined from the counts or the traffic itself. Embodiments can then dynamically fine tune the traffic monitoring rule in such a way that reduces the amount of traffic that the database agent sends to the security analysis server for database connections that are determined to be of the application database connection type, while continuing to send traffic to the security analysis server for database connections that are determined to be of the non-application database connection type.

Figure 1:
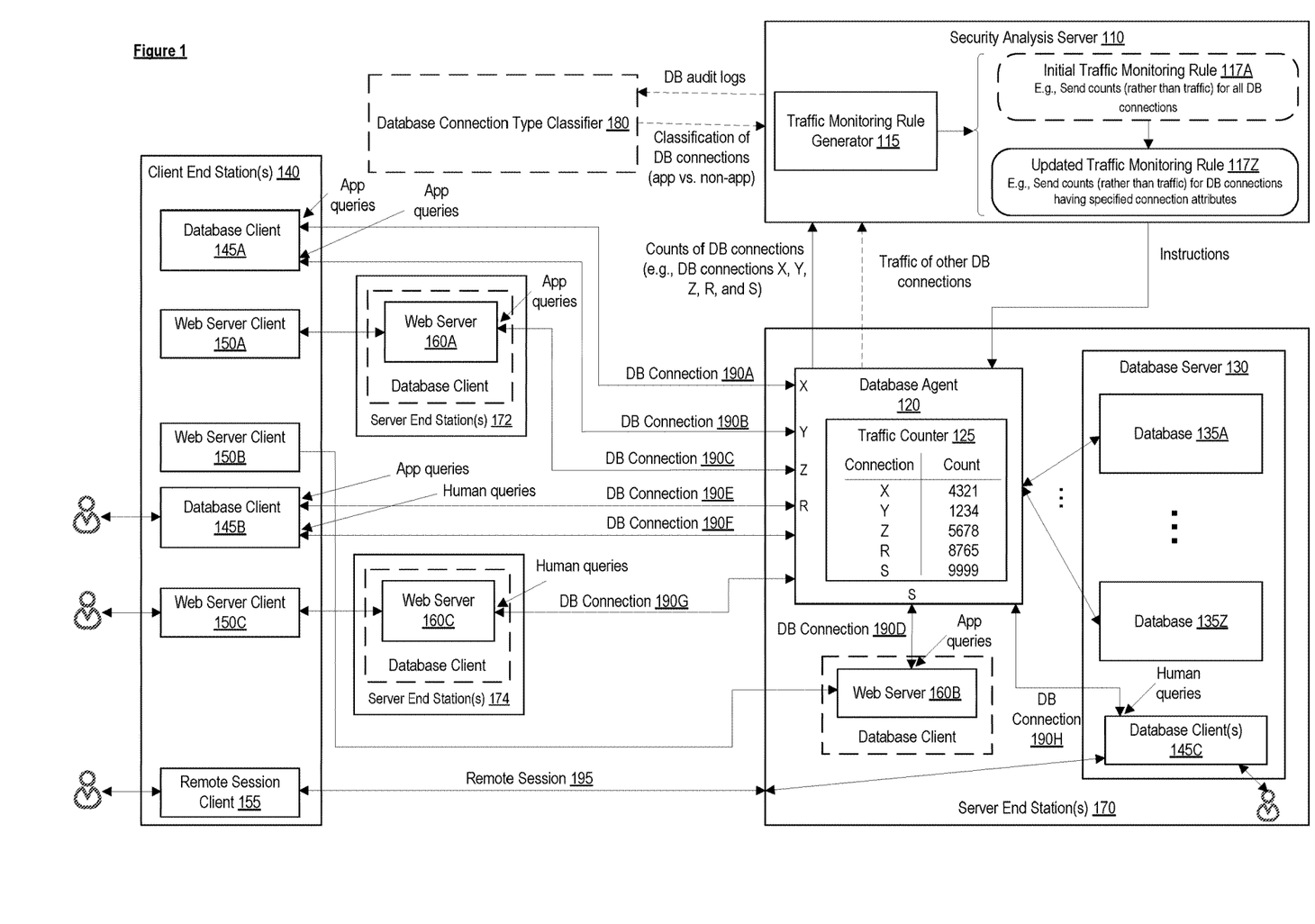
FIG. 1 is a block diagram illustrating a system in which a traffic monitoring rule for a database agent is dynamically generated based on an amount of traffic sent over database connections, according to some embodiments.

FIG. 1 is a block diagram illustrating a system in which a traffic monitoring rule for a database agent is dynamically generated based on an amount of traffic sent over database connections, according to some embodiments. As shown in the diagram, the system includes client end station(s) 140, server end station(s) 170, 172, and 174, and a security analysis server 110. As used herein, a server end station is an electronic device that is operable to execute or otherwise implement one or more servers providing access to data and/or services (e.g., web server or database server). As used herein, a client end station is an electronic device operable to execute or otherwise implement applications that, among other functions, can access the data and/or services provided by one or more server end stations (e.g., web server client or database client). There are a wide variety of types of client end stations, including but not limited to workstations/PCs, laptops, netbooks, mobile phones, smartphones, multimedia phones, smart watches, Voice Over Internet Protocol (VOIP) phones, user equipment (UE), terminals, portable media players, Global Positioning System (GPS) units, gaming systems, wearable computing devices, set-top boxes, etc. A web server is an application that delivers web pages (or other content) upon the request of web server clients (e.g., Hypertext Transfer Protocol (HTTP) clients such as a web browser).

While a certain configuration of the components is shown in the diagrams, it should be understood that the configuration is shown by way of example, and not intended to be limiting. Other embodiments may utilize different configurations.

As shown in the diagram, the server end station(s) 170 implement a database server 130 that hosts databases 135A-Z. The server end station(s) 170 also implement a database agent 120. The database agent 120 (sometimes referred to simply as "agent") is a piece of software typically installed locally or close to the databases 135 that is configured to monitor database activity of the databases 135. For example, the database agent 120 may be configured such that it can see the traffic to the databases 135 (e.g., queries submitted to the databases by database clients) as well as the responses to the queries (e.g., an indication of success, a value, one or more tuples, etc.). The database agent 120 is typically implemented as a lightweight process to impose minimum overhead on the database server 130. As such, it typically performs minimal analysis of the traffic it sees and forwards traffic that needs to be further analyzed to the security analysis server 110. The database agent 120 can be implemented by one or more electronic devices. While the diagram shows a single database agent 120 that monitors accesses to all of the databases 135A-Z, other embodiments may be configured differently (e.g., each database 135 may have a dedicated database agent 120 that monitors accesses to that database 135; a separate database agent 120 for each database vendor type (e.g., separate database agents 120 for Oracle databases, MySQL databases, and Mongo databases); separate database agents 120 for relational databases (e.g., Oracle and MySQL databases) and non-relational databases (e.g., NoSQL databases)). While the diagram shows the database agent 120 as being implemented separately from the database server 130, in some embodiments, the database agent 120 is integrated within the database server 130. In one embodiment, the database agent 120 is implemented as a loadable kernel component that is configured to see the traffic being sent to and from the databases 135. In some embodiments, the database agent 120 can be implemented remotely (as part of a remote agent/sensor that is remote from the server end station(s) 170, database server 130, and/or the enterprise network that is able to see traffic to the databases 135).

The client end station(s) 140 implement database clients 145A and 145B, web server clients 150A and 150B, and a remote session client 155. As shown in the diagram, database client 145A has established database connection 190A with one of the databases 135 and has also established database connection 190B with one of the databases 135. Database connections 190A and 190B can be database connections 190 to the same database 135 or to different databases 135. The traffic sent over these database connections 190 pass through the database agent 120, and thus the database agent 120 can monitor this traffic. Database client 145A may submit queries and receive responses to queries over database connections 190A and 190B. In this example, database client 145A submits application-generated queries over both database connections 190A and 190B. As used herein, application-generated queries refer to predefined queries formed by applications, as opposed to ad-hoc queries that are generated by human users or scripts. As shown in the diagram, database client 145B has established database connection 190E with one of the databases 135 and has also established database connection 190F with one of the databases 135. Database connections 190E and 190F can be database connections 190 to the same database 135 or to different databases 135. The traffic sent over these database connections 190E and 190F pass through the database agent 120, and thus the database agent 120 can monitor this traffic. Database client 145B may submit queries and receive response to queries over these database connections 190. In this example, database client 145B submits application-generated queries over database connection 190E and submits ad-hoc queries (e.g., formed by a human end-user interacting with database client 145B) over database connection 190F.

As shown in the diagram, server end station(s) 172 implement web server 160A and server end station(s) 174 implement web server 160C. Also, server end station(s) 170 implement web server 160B. In one embodiment, web server 160B is a web server that is provided by the same enterprise that provides the database server 130 and thus web server 160B and the database server 130 are part of the same enterprise network. Web server client 150A may interact with web server 160A to access a web application hosted by web server 160A. As part of satisfying requests received from web server client 150A to access the web application, web server 160A has established a database connection 190C with one of the databases 135 hosted by the database server 130. The traffic sent over this database connection 190C passes through the database agent 120, and thus the database agent 120 can monitor this traffic. Web server 160A may submit queries and receive responses to queries over database connection 190C. In this sense, web server 160C acts as a database client with respect to the database server 130. In this example, web server 160A submits application-generated queries (e.g., formed by the web application) over database connection 190C. In a similar manner, web server client 150B may interact with web server 160B to access a web application hosted by web server 160B. As part of satisfying requests received from web server client 150B to access the web application, web server 160B has established a database connection 190D with one of the databases 135 hosted by the database server 130. The traffic sent over this database connection 190D passes through the database agent 120, and thus the database agent 120 can monitor this traffic. Web server 160B may submit queries and receive responses to queries over database connection 190D (and thus act as a database client with respect to the database server 130). In this example, web server 160B submits application-generated queries (e.g., formed by the web application) over database connection 190D. Also, web server client 150C may interact with web server 160C to access a web application hosted by web server 160C. As part of satisfying requests received from web server client 150C to access the web application, web server 160C has established a database connection 190G with one of the databases 135 hosted by the database server 130. Web server 160C may submit queries and receive responses to queries over this database connection 190G. In this example, web server 160C submits ad-hoc queries (e.g., formed by a human end-user or a script) over database connection 190G. This may be the case, for example, if the web application provided by web server 160C allows web server clients 150 interacting with it to submit ad-hoc queries formed by end-users.

Remote session client 155 allows an end-user to remotely access one or more of server end station(s) 170 via a remote session 195. For example, remote session client 155 may be a remote desktop application or a secure shell (SSH) application. The remote session 195 may be used to access database client 145C, which is installed local to the database server 130. An end-user interacting with the remote session client 370 can form queries and enter queries to be submitted to one of the databases 135 via database client 145C. Also, an end-user that has physical access to server end station(s) 170 may directly access database client 145C and enter queries to be submitted to one of the databases 135 via database client 145C without establishing a remote session. These queries are ad-hoc queries formed by the end-user and are submitted to the database 135 over database connection 190H. The traffic sent over database connection 190H passes through the database agent 120, and thus the database agent 120 can monitor this traffic. As described above, traffic sent over the database connections 190 passes through the database agent 120 and thus is "seen" by the database agent 120. The database agent 120 may send some or all of the traffic that passes through it to the security analysis server 110 for further analysis. The security analysis server 110 is configured to analyze the traffic (e.g., traffic received from the database agent 120) and to make various security decisions based on its analysis of the traffic (e.g., decide whether certain traffic is suspicious and/or malicious, and whether to block and/or generate alerts responsive to such traffic). The security analysis server 110 can be implemented by one or more electronic devices.

As shown in the diagram, the security analysis server 110 may include a traffic monitoring rule generator 115. The traffic monitoring rule generator 115 may generate traffic monitoring rules. A traffic monitoring rule indicates the database connections for which the database agent 120 is to send counts of the amount (i.e., volume) of traffic (instead of all of the traffic itself) sent over those database connections to the security analysis server 110. In one embodiment, the traffic monitoring rule generator 115 initially generates an initial traffic monitoring rule 117A (e.g., when the database agent 120 is first deployed) that indicates that the database agent 120 is to send counts of the amount of traffic (instead of all of the traffic itself) sent over all database connections 190. The security analysis server 110 may apply this traffic monitoring rule 117A by sending instructions to the database agent 120 that indicate that the database agent 120 to send counts of the amount of traffic (instead of all of the traffic itself) sent over all database connections 190.

In response to receiving the instructions, the database agent 120 maintains counts of the amount of traffic sent over each of the database connections 190 (e.g., on a per-connection basis) and sends these counts to the security analysis server 110. The counts can be maintained for inbound traffic (e.g., traffic towards the database server 130), outbound traffic (e.g., traffic towards database clients), or both. The database agent 120 may send counts to the security analysis server 110 periodically (e.g., at predetermined intervals), when a count reaches a threshold value, when requested by the security analysis server 110, or based on any other suitable triggering/timing mechanism. The database agent 120 may also send to the security analysis server 110 a portion of the traffic sent over each of the database connections to allow the security analysis server 110 to determine the connection attributes of the database connections 190. In one embodiment, the database agent 120 sends additional information along with the counts to indicate the database connection 190 associated with each of the counts. For example, the database agent 120 may send database connection IDs along with the counts that identify the database connections 190 associated with respective ones of the counts.

In one embodiment, the traffic monitoring rule generator 115 aggregates the counts for a group of database connections 190 that have similar connection attributes (e.g., a same set of connection attributes). For example, the traffic monitoring rule generator 115 may aggregate counts for a group of database connections 190 that have the same host name, application name, database user, operating system (OS) name, client Internet Protocol (IP) address, or any combination thereof. The security analysis server 110 may determine the connection attributes of the database connections from the portion of traffic that it received from the database agent 120. While certain connection attributes are mentioned herein, it should be understood that these are mentioned by way of example and are not intended to be limiting. Other embodiments may use different connection attributes and/or a different combination of connection attributes than mentioned herein.

The traffic monitoring rule generator 115 may analyze the counts to determine which database connections are of the application database connection type as opposed to being of the non-application database connection type. As used herein, an application database connection type is a type of database connection 190 over which application-generated queries are submitted (e.g., predefined commands/queries formed by a business application). As used herein, a non-application database connection type is a type of database connection 190 over which ad-hoc queries are submitted (e.g., commands/queries formed by a human user or a script). For example, in FIG. 1, database connections 190A, 190B, 190C, 190D, and 190E are considered to be of the application database connection type since application-generated queries are submitted over these database connections 190. However, database connections 190F, 190G, and 190H are considered to be of the non-application database connection type since ad-hoc queries are sent over these database connections 190.

In one embodiment, the traffic monitoring rule generator 115 may determine that database connections 190 having relatively high counts (e.g., counts that exceed a predefined threshold level) are of the application database connection type, while database connections 190 having relatively low counts (e.g., counts below the predefined threshold level) are of the non-application database connection type. In an embodiment where the traffic monitoring rule generator 115 maintains aggregate counts (for groups of database connections 190 having similar connection attributes), the traffic monitoring rule generator 115 may determine which database connections 190 are of the application database connection type at the group level (e.g., such that all database connections 190 in the same group are determined to be of the same database connection type). Thus, the traffic monitoring rule generator 115 may use the counts as a proxy to determine whether a database connection 190 is of the application database connection type or the non-application database connection type. In general, traffic sent over database connections 190 of the application database connection type is more likely to be trusted (since it is generated by applications forming predefined queries), and thus the security analysis server 110 may not need to monitor such traffic very closely. In contrast, traffic sent over database connections 190 of the non-application database connection type is less likely to be trusted (since it is generated by users or scripts forming ad-hoc queries), and thus the security analysis server 110 may want to monitor such traffic more closely.

Accordingly, in one embodiment, the traffic monitoring rule generator 115 may generate an updated traffic monitoring rule 117Z that indicates that the database agent 120 is to send counts (instead of all of the traffic itself) to the security analysis server 110 for one or more database connections 190 that it determined to be of the application database connection type (e.g., which it determined based on the counts, as described above). In this example, it is assumed that the traffic monitoring rule generator 115 determined (based on analyzing counts) that database connections 190A, 190B, 190C, 190D, and 190E (designated in the diagram as database connections X, Y, Z, S, and R, respectively) are of the application database connection type (this happens to be correct since application-generated queries are submitted over these database connections 190). The updated traffic monitoring rule 117Z may indicate the database connections 190 for which the database agent 120 is to send counts (instead of all of the traffic itself) using a set of connection attributes (e.g., the same connection attributes that are used to aggregate counts). For example, the updated traffic monitoring rule 117Z may indicate that the database agent 120 is to send counts (instead of all of the traffic itself) for database connections 190 having connection attributes of database user='APPSRV', OS user='appsrv', and application name='CRM App'. The updated traffic monitoring rule 117Z may be generated such that the set of connection attributes encompasses one or more of the database connections 190 determined by the security analysis server 110 to be of the application database connection type. It can be implied from such traffic monitoring rule 117Z that the database agent 120 is to send traffic (instead of counts) to the security analysis server 110 for any database connections 190 not indicated by the traffic monitoring rule 117Z.

The security analysis server 110 may apply the updated traffic monitoring rule 117Z by sending instructions to the database agent 120 that indicate that the database agent 120 to continue sending counts of the amount of traffic sent over specific ones of the database connections 190 that are encompassed by the updated traffic monitoring rule 117Z (e.g., database connections 190A, 190B, 190C, 190D, and 190E). In one embodiment, the database agent 120 can imply that it is to send the traffic itself for any database connections 190 for which it has not received explicit instructions from the security analysis server 110 to send counts. The instructions may indicate the database connections 190 (for which the database agent 120 is to send counts) using database connection IDs. Thus, while the traffic monitoring rule may identify/indicate database connections 190 in terms of a set of connection attributes, the instructions sent to the database agent 120 may identify database connections 190 using database connections IDs (since the database agent 120 is typically a lighter-weight process compared to the security analysis server 110 and may not parse all of the connection attributes that the security analysis server 110 parses from the traffic). In response to receiving the instructions, the database agent 120 may continue to maintain counts of the amount of traffic sent over the specified ones of the database connections 190 (e.g., using a traffic counter 125). Also, the database agent 120 may continue to send to the security analysis server 110 counts (instead of all of the traffic itself) for the specified ones of the database connections 190 and start sending to the security analysis server 110 traffic sent over all other database connections 190 according to the instructions.

In one embodiment, when the database agent 120 sees a new database connection 190, then it may initially send the traffic sent over this new database connection 190 to the security analysis server 110. The security analysis server 110 may parse this traffic to determine the connection attributes of the new database connection 190 and evaluate these connection attributes against the current traffic monitoring rule 117 (which in this example is updated traffic monitoring rule 117Z) to determine whether the database agent 120 should start sending counts of the amount of traffic sent over the new database connection 190 to the security analysis server 110 or should continue to send the traffic sent over the new database connection 190 to the security analysis server 110. If the security analysis server 110 determines that the database agent 120 should start sending counts of the amount of traffic (instead of all of the traffic itself), then the security analysis server 110 may send instructions to the database agent 120 indicating as such. However, if the security analysis server 110 determines that the database agent 120 should continue to send the traffic itself sent over the new database connection 190, the security analysis server 110 may send instructions to the database agent 120 indicating as such (in some embodiments the security analysis server 110 may not need to send instructions to the database agent 120 with regard to the new database connection 190 if the database agent 120 is already sending the traffic for the new database connection 190 to the security analysis server 110). Thus, the security analysis server 110 may use the current traffic monitoring rule (updated traffic monitoring rule 117Z in this example) to determine how to treat new database connections 190 (e.g., whether the database agent 120 should send counts or traffic for the new database connection 190).

In response to receiving the instructions from the security analysis server 110, the database agent 120 may send counts of the amount of traffic or the traffic itself sent over the new database connection 190 according to the instructions. In the case that the database agent 120 sends the traffic itself to the security analysis server 110 (because the new database connection 190 is not encompassed by the current traffic monitoring rule), the traffic monitoring rule generator 115 may determine whether the new database connection 190 is of the application database connection type based on the amount of traffic sent over the new database connection 190. If the traffic monitoring rule generator 115 determines that the new database connection 190 is of the application database connection type (e.g., because there is a large amount of traffic being sent over this database connection 190), then the traffic monitoring rule generator 115 may update the traffic monitoring rule 117 such that it encompasses the new database connection 190 and start applying the updated traffic monitoring rule 117 (which may in turn involve sending instructions to the database agent 120 to indicate that the database agent 120 to send counts (instead of all of the traffic itself) for the new database connection 190).

In one embodiment, the traffic monitoring rule generator 115 may update the traffic monitoring rule such that it no longer encompasses certain database connections 190, for example, if the security analysis server 110 determines that those database connections 190 are not of the application database connection type but are actually of the non-application database connection type (e.g., based on counts received from the database agent 120). In this manner, the traffic monitoring rule generator 115 may dynamically generate and apply new/updated traffic monitoring rules 117 as it receives additional information (e.g., new counts and/or traffic).

While embodiments are described above where the traffic monitoring rule 117 indicates the database connections 190 for which the database agent 120 is to send counts (instead of all of the traffic itself), in an alternative embodiment, the traffic monitoring rule 117 may indicate the database connections 190 for which the database agent 120 is to send traffic (instead of counts). The security analysis server 110 may apply such a traffic monitoring rule 117 by sending instructions to the database agent 120 that indicate that the database agent 120 is to send the traffic itself sent over specific ones of the database connections 190 that are encompassed by the traffic monitoring rule 117. In one embodiment, the database agent 120 can imply that it is to send counts for any database connections 190 for which it has not received explicit instructions from the security analysis server 110 to send the traffic itself.

Also, embodiments are described above where the initial traffic monitoring rule 117A indicates that counts (instead of all of the traffic itself) are to be sent to the security analysis server 110 for all of the database connections 190, other embodiments may start with a different initial traffic monitoring rule. For example, some embodiments may start with an initial traffic monitoring rule that indicates that traffic is to be sent to the security analysis server 110 for all of the database connections 190 (this could be achieved, for example, by not having a traffic monitoring rule 117 (i.e., a null traffic monitoring rule)). However, this may cause the security analysis server 110 to be overloaded with traffic in the beginning when the security analysis server 110 is initially deployed/activated.

In one embodiment, the traffic monitoring rule generator 115 also generates traffic monitoring rules based on the current resource utilization of the security analysis server 110. For example, if the current resource utilization of the security analysis server 110 (e.g., central processing unit (CPU) usage or memory usage) is determined to be relatively high (e.g., above a threshold level), then the traffic monitoring rule generator 115 may generate/update/modify a traffic monitoring rule such that it causes the database agent 120 to send counts (instead of all of the traffic itself) for more of the database connections 190 (e.g., cause the database agent 120 to send counts (instead of all of the traffic itself) for all database connections 190 that have been determined to be of the application database connection type). This allows the security analysis server 110 to conserve resources during periods of high resource utilization. However, if the current resource utilization of the security analysis server 110 is relatively low (e.g., below the threshold level), then the traffic monitoring rule generator 115 may generate/update/modify a traffic monitoring rule such that it causes the database agent 120 to send traffic for more of the database connections 190. This allows the security analysis server 110 to make use of its available resources to analyze more of the traffic during periods of low resource utilization.

Additionally, or alternatively, the traffic monitoring rule generator 115 in some embodiments generates/updates/modifies traffic monitoring rules based on a predicted amount of traffic that will be sent over the database connections 190. For example, the traffic monitoring rule generator 115 may keep track of a history of the amount of traffic being sent over the database connections 190 at different times (e.g., different hours during the day and/or different days of the week) based on the counts and/or traffic it receives from the database agent 120. The traffic monitoring rule generator 115 may use this historical information to predict the amount of traffic that will be sent over the database connections 190 at a given day/time. If the traffic monitoring rule generator 115 predicts that there is going to be a high volume of traffic being sent over the database connections 190, then the traffic monitoring rule generator 115 may preemptively generate/update/modify a traffic monitoring rule such that it causes the database agent 120 to send counts (instead of all of the traffic itself) for more of the database connections 190 (to conserve resources). However, if the traffic monitoring rule generator 115 predicts that there is going to be a low volume of traffic being sent over the database connections 190, then the traffic monitoring rule generator 115 may preemptively generate/update/modify a traffic monitoring rule such that it causes the database agent 120 to send traffic for more of the database connections 190 (to make use of its available resources).

If the security analysis server 110 has limited resources and/or has a high utilization rate, then this may require that the database agent 120 send counts (instead of all of the traffic itself) to the security analysis server 110 for more of the database connections 190, which could compromise the security of the databases 135. Thus, in one embodiment, the security analysis server 110 generates a message for the user (e.g., network security administrator) regarding the additional resource capacity that is needed to be able to allow the database agent 120 to send the traffic itself (instead of just counts) to the security analysis server 110 for one or more database connections 190. For example, if it is known that the security analysis server 110 can handle analyzing 100 Gigabytes (GB) of traffic per day and there is a database connection 190 (for which the database agent 120 is currently sending counts) that has 200 GB of traffic per day, then the security analysis server 110 may generate a message for the user that indicates the amount of additional resources (e.g., in terms of CPU, memory, bandwidth, and/or additional instances of the security analysis server 110) that need to be allocated to be able to allow the database agent 120 to send the traffic itself (instead of just counts) to the security analysis server 110 for that database connection 190. The user may then allocate additional resources to allow the database agent 120 to send the traffic itself for that database connection 190.

As shown in the diagram, in one embodiment, the system further includes a database connection type classifier 180 that is communicatively coupled to the security analysis server 110. The database connection type classifier 180 is configured to classify database connections 190 into database connection types based on analyzing database audit logs (this may take longer but be more accurate than basing the determination on only the amounts of traffic, and thus be used to correct any errors made in determining the database connection types based on just the amount of traffic). In one embodiment, the database connection type classifier 180 classifies database connections 190 as being of the application database connection type or non-application database connection type. The database connection type classifier 180 can be implemented by one or more electronic devices.

In one embodiment, the security analysis server 110 sends database audit logs to the database connection type classifier 180. These database audit logs could be the traffic that the security analysis server 110 received from the database agent 120 or some information about the traffic (e.g., a summarized and/or formatted version of the log files). The database connection type classifier 180 may analyze this information to classify the database connections 190 as being of the application database connection type or the non-application database connection type. The database connection type classifier 180 may then send the classification results to the security analysis server 110 (to be used by the traffic monitoring rule generator 115). In one embodiment, the database connection type classifier 180 classifies database connections 190 at the group level (e.g., classifies a group of database connections 190 having similar connection attributes—these could be the same connection attributes that the traffic monitoring rule generator 115 uses to group database connections 190).

In one embodiment, the database connection type classifier 180 uses machine learning techniques to classify database connections 190 based on database audit logs. The database connection type classifier 180 may classify database connections 190 based on a variety of factors learned from analyzing the database audit logs such as, but not limited to, the name of the client application that is being used to access the database 135, the driver being used to connect to the database 135, the types of commands/queries being submitted over the database connection 190, the amount of traffic being sent over the database connection 190, the frequency of commands/queries submitted over the database connection 190, and/or the names of accessed objects (e.g., tables, views, procedures) and their access patterns. The classification performed by the database connection type classifier 180 is typically more accurate than the classification performed by the traffic monitoring rule generator 115 since the database connection type classifier 180 analyzes more features of the database connection 190 (and not just the amount of traffic) from database audit logs that cover a relatively long period of time (e.g., 28 days of database activity), whereas the traffic monitoring rule generator 115 typically classifies database connections 190 based on the amount of traffic sent over the database connections 190 over a relatively short period of time. In embodiments where the database connection type classifier 180 is present, the traffic monitoring rule generator 115 may initially rely on its own classification of the database connections 190 (based on analyzing the amount of traffic sent over the database connections 190) since it can be obtained quicker, but then begin relying on the classifications produced by the database connection type classifier 180 once they are made available. In one embodiment, if the traffic monitoring rule generator 115 determines that its classification of a given database connection 190 is different from the classification produced by the database connection type classifier 180, then the traffic monitoring rule generator 115 uses the classification produced by the database connection type classifier 180 when generating traffic monitoring rules 117 since the classification produced by the database connection type classifier 180 is generally considered to be more accurate. For example, if the database connection type classifier 180 classifies a particular database connection 190 as being of the application database connection type, then the traffic monitoring rule generator 115 generates a traffic monitoring rule such that it causes the database agent 120 to send counts (instead of all of the traffic itself) for this database connection 190 (even if there is a relatively low amount of traffic being sent over this database connection 190 and the traffic monitoring rule generator 115 determined that this database connection 190 is of the non-application database connection type).

In embodiments where the database connection type classifier 180 is present, the database agent 120 may sends a sample of traffic sent over one or more database connections 190 (even for database connections 190 that the database agent 120 is sending counts) to the security analysis server 110 so that the security analysis server 110 can send this traffic or information about this traffic to the database connection type classifier 180. This sample may be the same as the portion of traffic that the database agent 120 sends to the security analysis server 110 that allows the security analysis server 110 to determine the connection attributes of database connections 190 or it could be different traffic. In one embodiment, the sample is the first N megabytes of traffic (e.g., 5 megabytes), a random sample of the traffic, or predetermined portion(s) of the traffic sent over the database connection 190. Thus, in such embodiments, even if the database agent 120 is configured to send counts (instead of traffic) for a database connection 190, the database agent 120 may still send a sample of the traffic sent over this database connection 190 to the security analysis server 110 so that the security analysis server 110 can send this traffic to the database connection type classifier 180. This provides the database connection type classifier 180 with information that allows it to classify the database connections 190 and/or to perform any other security functions.

Embodiments can thus classify database connections 190 as being of the application database connection type or non-application database connection type based on the amount of traffic being sent over those database connections 190 as determined from counts or the traffic itself. Embodiments can then dynamically fine tune the traffic monitoring rule in such a way that reduces the amount of traffic that the database agent 120 sends to the security analysis server 110 for database connections 190 that are determined to be of the application database connection type (which are generally considered to be trusted), while sending traffic to the security analysis server 110 for database connections 190 that are determined to be of the non-application database connection type (which are generally considered to be less trusted). This reduces the amount of traffic that the database agent 120 sends to the security analysis server 110 without significantly compromising security (or without compromising security at all) and also reduces the amount of processing/analyzing that the security analysis server 110 needs to perform, which help to conserve the resources of the database monitoring infrastructure, thereby protecting the database monitoring infrastructure against overloading (which can lead to audit losses).

Figure 2:
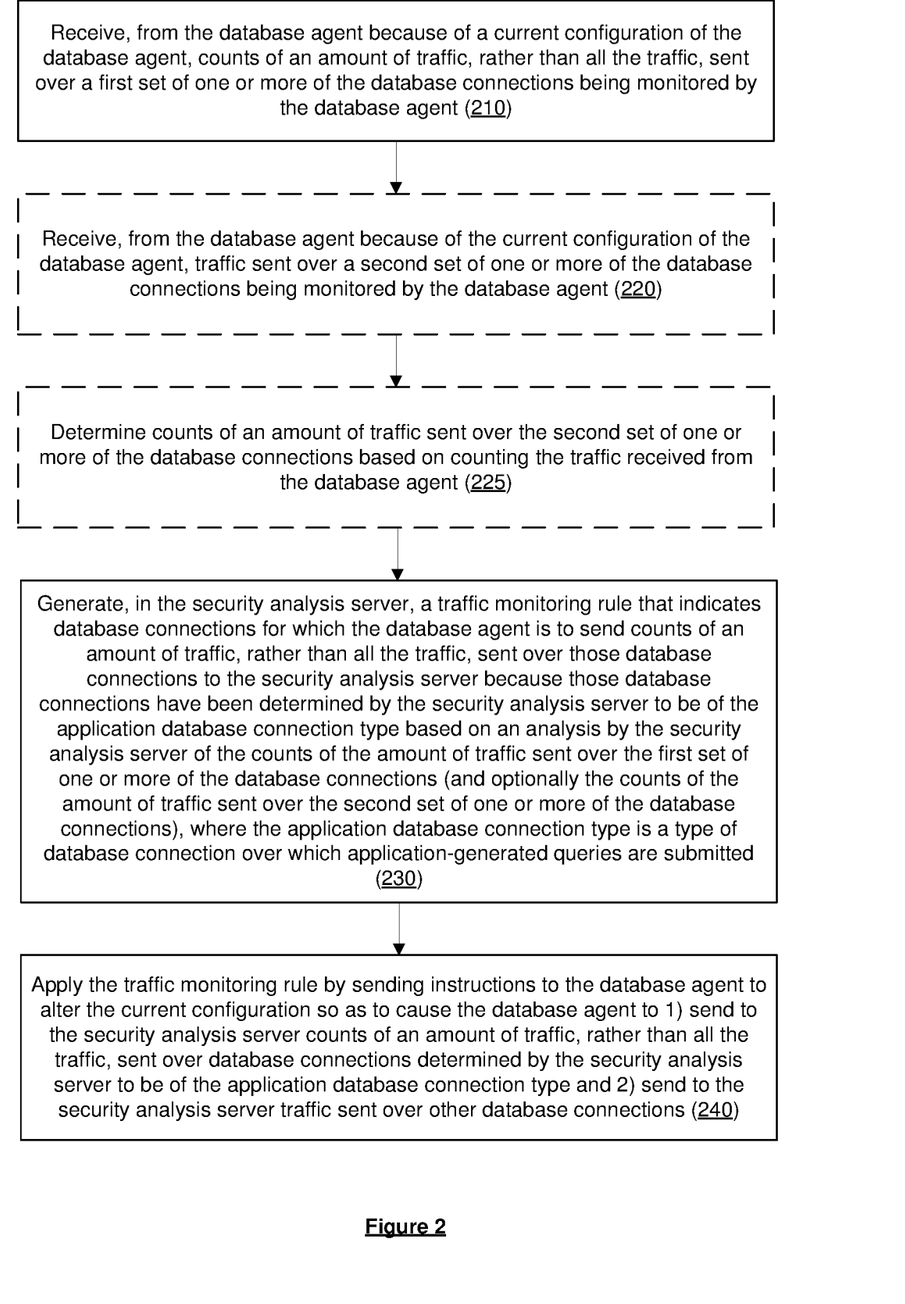
FIG. 2 is a flow diagram of a process by a security analysis server for dynamically generating a traffic monitoring rule for a database agent based on an amount of traffic sent over database connections, according to some embodiments.

FIG. 2 is a flow diagram of a process by a security analysis server for dynamically generating a traffic monitoring rule for a database agent based on an amount of traffic sent over database connections, according to some embodiments. In one embodiment, process is implemented by a security analysis server 110. The process can be implemented using hardware, software, firmware, or any combination thereof.

At block 210, the security analysis server 110 receives, because of a current configuration of the database agent, counts of an amount of traffic, rather than all the traffic, sent over a first set of one or more of the database connections being monitored by the database agent.

In one embodiment, at block 220, the security analysis server 110 also receives, because of the current configuration of the database agent, traffic sent over a second set of one or more of the database connections being monitored by the database agent. At block 225, the security analysis server 110 may determine counts of an amount of traffic sent over the second set of one or more of the database connections based on counting the traffic received from the database agent.

At block 230, the security analysis server 110 generates a traffic monitoring rule that indicates database connections for which the database agent is to send counts of an amount of traffic, rather than all the traffic, sent over those database connections to the security analysis server 110 because those database connections have been determined by the security analysis server to be of the application database connection type based on an analysis by the security analysis server 110 of the counts of the amount of traffic sent over the first set of one or more of the database connections (and optionally the counts of the amount of traffic sent over the second set of one or more of the database connections), where the application database connection type is a type of database connection over which application-generated queries are submitted.

At block 240, the security analysis server 110 applies the traffic monitoring rule by sending instructions to the database agent to alter the current configuration so as to cause the database agent to 1) send to the security analysis server 110 counts of an amount of traffic, rather than all the traffic, sent over database connections determined by the security analysis server 110 to be of the application database connection type and 2) send to the security analysis server traffic 110 sent over other database connections.

Figure 3:
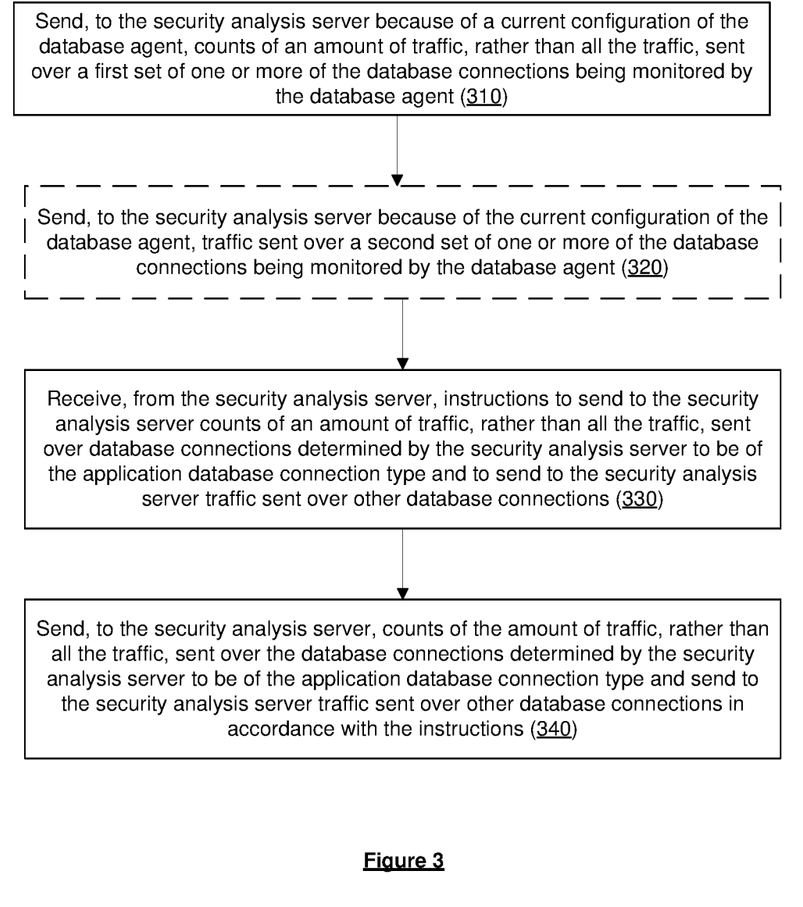
FIG. 3 is a flow diagram of a process by a database agent for applying a traffic monitoring rule received from a security analysis server, according to some embodiments.

FIG. 3 is a flow diagram of a process by a database agent for applying a traffic monitoring rule received from a security analysis server, according to some embodiments. In one embodiment, the process is implemented by a database agent 120. The process can be implemented using hardware, software, firmware, or any combination thereof.

At block 310, the database agent 120 sends, to the security analysis server because of a current configuration of the database agent 120, counts of an amount of traffic, rather than all the traffic, sent over a first set of one or more of the database connections being monitored by the database agent 120.

In one embodiment, at block 320, the database agent 120 also sends, to the security analysis server because of the current configuration of the database agent 120, traffic sent over a second set of one or more of the database connections being monitored by the database agent 120.

At block 330, the database agent 120 receives, from the security analysis server 110, instructions to send to the security analysis server counts of an amount of traffic, rather than all the traffic, sent over database connections determined by the security analysis server to be of the application database connection type and to send to the security analysis server traffic sent over other database connections.

At block 340, the database agent 120 sends, to the security analysis server, counts of the amount of traffic, rather than all the traffic, sent over the database connections determined by the security analysis server to be of the application database connection type and send to the security analysis server traffic sent over other database connections in accordance with the instructions.

Figure 4:
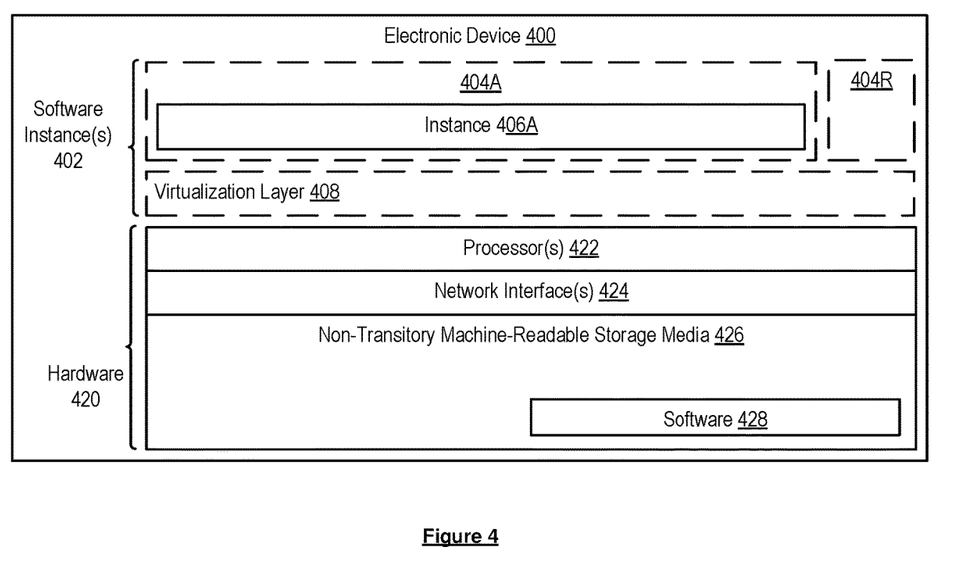
FIG. 4 is a block diagram illustrating an electronic device, according to some embodiments.

FIG. 4 is a block diagram illustrating an electronic device, according to some embodiments. FIG. 4 includes hardware 420 comprising a set of one or more processor(s) 422, a set of one or more network interfaces 424 (wireless and/or wired), and non-transitory machine-readable storage media 426 having stored therein software 428 (which includes instructions executable by the set of one or more processor(s) 422). Software 428 can include code, which when executed by hardware 420, causes the electronic device 400 to perform operations of one or more embodiments described herein. Thus, as previously described, the security analysis server 110 and/or the database agent 120 may be implemented in one or more electronic devices. Also, the database connection type classifier 180 may be implemented in one or more electronic devices. Also, the database server 130 and the database clients 145 may each be implemented in in different electronic devices and the web servers 160 and the web server clients 150 may each be implemented in different electronic devices.

In electronic devices that use compute virtualization, the set of one or more processor(s) 422 typically execute software to instantiate a virtualization layer 408 and software container(s) 404A-R (e.g., with operating system-level virtualization, the virtualization layer 408 represents the kernel of an operating system (or a shim executing on a base operating system) that allows for the creation of multiple software containers 404A-R (representing separate user space instances and also called virtualization engines, virtual private servers, or jails) that may each be used to execute a set of one or more applications; with full virtualization, the virtualization layer 408 represents a hypervisor (sometimes referred to as a virtual machine monitor (VMM)) or a hypervisor executing on top of a host operating system, and the software containers 404A-R each represent a tightly isolated form of a software container called a virtual machine that is run by the hypervisor and may include a guest operating system; with para-virtualization, an operating system or application running with a virtual machine may be aware of the presence of virtualization for optimization purposes). Again, in electronic devices where compute virtualization is used, during operation an instance of the software 428 (illustrated as instance 406A) is executed within the software container 404A on the virtualization layer 408. In electronic devices where compute virtualization is not used, the instance 406A on top of a host operating system is executed on the "bare metal" electronic device 400. The instantiation of the instance 406A, as well as the virtualization layer 408 and software containers 404A-R if implemented, are collectively referred to as software instance(s) 402.

Alternative implementations of an electronic device may have numerous variations from that described above. For example, customized hardware and/or accelerators might also be used in an electronic device.

The techniques shown in the figures can be implemented using code and data stored and executed on one or more electronic devices (e.g., an end station, a network device). Such electronic devices, which are also referred to as computing devices, store and communicate (internally and/or with other electronic devices over a network) code and data using computer-readable media, such as non-transitory machine-readable storage media (e.g., magnetic disks, optical disks, random access memory (RAM), read-only memory (ROM); flash memory, phase-change memory) and transitory computer-readable communication media (e.g., electrical, optical, acoustical or other form of propagated signals, such as carrier waves, infrared signals, digital signals). In addition, electronic devices include hardware, such as a set of one or more processors coupled to one or more other components, e.g., one or more non-transitory machine-readable storage media to store code and/or data, and a set of one or more wired or wireless network interfaces allowing the electronic device to transmit data to and receive data from other computing devices, typically across one or more networks (e.g., Local Area Networks (LANs), the Internet). The coupling of the set of processors and other components is typically through one or more interconnects within the electronic device, (e.g., busses, bridges). Thus, the non-transitory machine-readable storage media of a given electronic device typically stores code (i.e., instructions) for execution on the set of one or more processors of that electronic device. Of course, various parts of the various embodiments presented herein can be implemented using different combinations of software, firmware, and/or hardware. As used herein, a network device (e.g., a router, switch, bridge) is an electronic device that is a piece of networking equipment, including hardware and software, which communicatively interconnects other equipment on the network (e.g., other network devices, end stations). Some network devices are "multiple services network devices" that provide support for multiple networking functions (e.g., routing, bridging, switching), and/or provide support for multiple application services (e.g., data, voice, and video).

The operations in the flow diagrams have been described with reference to the exemplary embodiments of the other diagrams. However, it should be understood that the operations of the flow diagrams can be performed by embodiments of the invention other than those discussed with reference to these other diagrams, and the embodiments of the invention discussed with reference these other diagrams can perform operations different than those discussed with reference to the flow diagrams.

Similarly, while the flow diagrams in the figures show a particular order of operations performed by certain embodiments, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method by a security analysis server implemented by one or more electronic devices to generate an updated traffic monitoring rule for monitoring traffic sent over database connections established between one or more database clients and one or more databases, wherein the database connections are monitored by a database agent communicatively coupled to the security analysis server, the method comprising:

receiving, from the database agent because of a current configuration of the database agent, a count of an amount of traffic, rather than all the traffic, sent over each database connection in a first set of one or more of the database connections being monitored by the database agent;

generating, in the security analysis server, an updated traffic monitoring rule to replace an existing traffic monitoring rule, wherein the updated traffic monitoring rule indicates a second set of one or more of the database connections being monitored by the database agent for which the database agent is to send a count of an amount of traffic, rather than all the traffic, sent over each database connection in the second set of one or more database connections to the security analysis server because the database connections in the second set of one or more database connections have been determined by the security analysis server to be of an application database connection type based on an analysis by the security analysis server of the counts of the amount of traffic sent over the first set of one or more database connections, wherein the application database connection type is a type of database connection over which application-generated queries are submitted, wherein the second set of one or more database connections is a different set than the first set of one or more database connections; and applying the updated traffic monitoring rule by sending instructions to the database agent to alter the current configuration so as to cause the database agent to send to the security analysis server the count of the amount of traffic, rather than all the traffic, sent over each database connection in the second set of one or more database connections to reduce the amount of traffic sent by the database agent to the security analysis server for the database connections in the second set of one or more database connections because the database connections in the second set of one or more database connections have been determined by the security analysis server to be of the application database connection type which is a type of database connection that is considered to be trusted and
send to the security analysis server traffic sent over other database connections.

2. The method of claim 1, further comprising:
wherein the receiving further includes receiving, from the database agent because of the current configuration of the database agent, traffic sent over a third set of one or more of the database connections being monitored by the database agent;
determining counts of an amount of traffic sent over the third set of one or more database connections based on counting the traffic received from the database agent; and
wherein the generating further includes generating the updated traffic monitoring rule also based on an analysis by the security analysis server of the counts of the amount of traffic sent over the third set of one or more database connections.

3. The method of claim 2, wherein one or more database connections of the database connections being monitored by the database agent are determined by the security analysis server to be of the application database connection type based on a determination that those database connections have traffic volumes that exceed a predefined threshold level.

4. The method of claim 1, wherein the generating the updated traffic monitoring rule is also based on a current resource utilization of the security analysis server.

5. The method of claim 1, wherein the generating the updated traffic monitoring rule is also based on a predicted amount of traffic that will be sent over the database connections being monitored by the database agent.

6. The method of claim 1, wherein the updated traffic monitoring rule indicates the database connections for which the database agent is to send counts of an amount of traffic sent over those database connections to the security analysis server using a set of connection attributes.

7. The method of claim 6, wherein the set of connection attributes includes host name, application name, database user, operating system (OS) user, client Internet Protocol (IP) address, or any combination thereof.

8. The method of claim 1, wherein the instructions to the database agent indicate the database connections determined by the security analysis server to be of the application database connection type using database connection identifiers (IDs).

9. The method of claim 8, wherein the receiving further includes receiving, from the database agent, database connection IDs associated with the counts of the amount of traffic sent over the first set of one or more database connections.

10. The method of claim 1, further comprising:
maintaining aggregate counts per group of database connections that have a same set of connection attributes.

11. The method of claim 1, further comprising:
receiving a sample of traffic sent over database connections determined by the security analysis server to be of the application database connection type; and
sending the sample of traffic to a database connection type classifier that classifies database connections based on parsing traffic sent over those database connections as being of one of a plurality of database connections types that includes the application database connection type and a non-application database connection type, wherein the non-application database connection type is a type of database connection over which ad-hoc queries are submitted.

12. The method of claim 11, further comprising:
receiving, from the database connection type classifier, an indication of the database connection type of one or more of the database connections being monitored by the database agent, wherein one or more database connections of the database connections being monitored by the database agent that were previously determined by the security analysis server based on an analysis of the counts of the amount of traffic sent over those database connections to be of a given one of the plurality of database connection types are determined by the security analysis server to be of a different one of the plurality of database connection types based on the indications received from the database connection type classifier.

13. The method of claim 1, further comprising:
receiving, from the database agent, traffic sent over a new database connection being monitored by the database agent; and
applying the updated traffic monitoring rule by sending instructions to the database agent to cause the database agent to send to the security analysis server a count of an amount of traffic, rather than all the traffic, sent over the new database connection in response to a determination that the updated traffic monitoring rule encompasses the new database connection.

14. A set of one or more non-transitory computer readable storage media storing instructions which, when executed by one or more processors of one or more electronic devices implementing a security analysis server, cause the one or more electronic devices to perform operations for generating an updated traffic monitoring rule for monitoring traffic sent over database connections established between one or more database clients and one or more databases, wherein the database connections are monitored by a database agent communicatively coupled to the security analysis server, the operations comprising:
receiving, from the database agent because of a current configuration of the database agent, a count of an amount of traffic, rather than all the traffic, sent over each database connection in a first set of one or more of the database connections being monitored by the database agent;
generating, in the security analysis server, an updated traffic monitoring rule to replace an existing traffic monitoring rule, wherein the updated traffic monitoring rule indicates a second set of one or more of the database connections being monitored by the database agent for which the database agent is to send a count of an amount of traffic, rather than all the traffic, sent over each database connection in the second set of one or more database connections to the security analysis server because the database connections in the second set of one or more database connections have been determined by the security analysis server to be of an application database connection type based on an analysis by the security analysis server of the counts of the amount of traffic sent over the first set of one or more database connections, wherein the application database connection type is a type of database connection over which application-generated queries are submitted, wherein the second set of one or more database connections is a different set than the first set of one or more database connections; and applying the updated traffic monitoring rule by sending instructions to the database agent to alter the current configuration so as to cause the database agent to
send to the security analysis server the count of the amount of traffic, rather than all the traffic, sent over each database connection in the second set of one or more database connections to reduce the amount of traffic sent by the database agent to the security analysis server for the database connections in the second set of one or more database connections because the database connections in the second set of one or more database connections have been determined by the security analysis server to be of the application database connection type which is a type of database connection that is considered to be trusted and
send to the security analysis server traffic sent over other database connections.

15. The set of one or more non-transitory computer readable storage media of claim 14, wherein the instructions, when executed by the one or more processors of the one or more electronic devices, further cause the one or more electronic devices to perform further operations comprising:
wherein the receiving further includes receiving, from the database agent because of the current configuration of the database agent, traffic sent over a third set of one or more of the database connections being monitored by the database agent;
determining counts of an amount of traffic sent over the third set of one or more database connections based on counting the traffic received from the database agent; and
wherein the generating further includes generating the updated traffic monitoring rule also based on an analysis by the security analysis server of the counts of the amount of traffic sent over the third set of one or more database connections.

16. The set of one or more non-transitory computer readable storage media of claim 15, wherein one or more database connections of the database connections being monitored by the database agent are determined by the security analysis server to be of the application database connection type based on a determination that those database connections have traffic volumes that exceed a predefined threshold level.

17. The set of one or more non-transitory computer readable storage media of claim 14, wherein the generating the updated traffic monitoring rule is based on a current resource utilization of the security analysis server.

18. An electronic device configured to implement a security analysis server that is to generate an updated traffic monitoring rule for monitoring traffic sent over database connections established between one or more database clients and one or more databases, wherein the database connections are to be monitored by a database agent communicatively coupled to the security analysis server, the electronic device comprising:
one or more processors; and
a non-transitory machine-readable storage medium having instructions stored therein, which when executed by the one or more processors, cause the electronic device to:
receive, from the database agent because of a current configuration of the database agent, a count of an amount of traffic, rather than all the traffic, sent over each database connection in a first set of one or more of the database connections being monitored by the database agent,
generate, in the security analysis server, an updated traffic monitoring rule to replace an existing traffic monitoring rule, wherein the updated traffic monitoring rule indicates a second set of one or more of the database connections being monitored by the database agent for which the database agent is to send a count of an amount of traffic, rather than all the traffic, sent over each database connection in the second set of one or more database connections to the security analysis server because the database connections in the second set of one or more database connections have been determined by the security analysis server to be of an application database connection type based on an analysis by the security analysis server of the counts of the amount of traffic sent over the first set of one or more database connections, wherein the application database connection type is a type of database connection over which application-generated queries are submitted, wherein the second set of one or more database connections is a different set than the first set of one or more database connections, and
apply the updated traffic monitoring rule by sending instructions to the database agent to alter the current configuration so as to cause the database agent to:
send to the security analysis server the count of the amount of traffic, rather than all the traffic, sent over each database connection in the second set of one or more database connections to reduce the amount of traffic sent by the database agent to the security analysis server for the database connections in the second set of one or more database connections because the database connections in the second set of one or more database connections have been determined by the security analysis server to be of the application database connection type which is a type of database connection that is considered to be trusted and
send to the security analysis server traffic sent over other database connections.

19. The electronic device of claim 18, wherein the updated traffic monitoring rule indicates the database connections for which the database agent is to send counts of an amount of traffic sent over those database connections to the security analysis server using a set of connection attributes, wherein the set of connection attributes includes host name, application name, database user, operating system (OS) user, client Internet Protocol (IP) address, or any combination thereof.

20. The electronic device of claim 18, wherein the non-transitory machine-readable storage medium has further instructions stored therein, which when executed by the one or more processors, further cause the electronic device to:
receive, from the database agent, traffic sent over a new database connection being monitored by the database agent; and
apply the updated traffic monitoring rule by sending instructions to the database agent to cause the database agent to send to the security analysis server a count of an amount of traffic, rather than all the traffic, sent over the new database connection in response to a determination that the updated traffic monitoring rule encompasses the new database connection.

* * * * *